United States Patent
Krückels

(10) Patent No.: US 7,057,131 B2
(45) Date of Patent: Jun. 6, 2006

(54) STATIONARY WELDING DEVICE AND METHOD FOR LONGITUDINAL WELDING OF PROFILES

(75) Inventor: Thomas Krückels, Schopfheim (DE)

(73) Assignee: Dreistern-Werk Maschinenbau GmbH & Co. KG, Schopfheim (DE)

( * ) Notice: Subject to any disclaimer, the term of this patent is extended or adjusted under 35 U.S.C. 154(b) by 119 days.

(21) Appl. No.: 10/688,405

(22) Filed: Oct. 17, 2003

(65) Prior Publication Data
US 2004/0084424 A1    May 6, 2004

(30) Foreign Application Priority Data
Oct. 18, 2002    (EP) .................................. 02023369

(51) Int. Cl.
B23K 26/00    (2006.01)
(52) U.S. Cl. ........................ 219/121.63; 219/121.64; 219/121.78
(58) Field of Classification Search ........... 219/121.63, 219/121.64, 121.78, 121.65, 121.66, 121.82
See application file for complete search history.

(56) References Cited

U.S. PATENT DOCUMENTS

| | | | | |
|---|---|---|---|---|
| 2,766,368 A | * | 10/1956 | Berkeley | .................. 219/60 R |
| 4,577,796 A | * | 3/1986 | Powers et al. | ............... 228/102 |
| 6,545,246 B1 | * | 4/2003 | Kummle | ................. 219/121.63 |

FOREIGN PATENT DOCUMENTS

| EP | 1125652 | 8/2001 |
|---|---|---|
| GB | 741302 | 11/1955 |

* cited by examiner

Primary Examiner—M. Alexandra Elve
(74) Attorney, Agent, or Firm—Volpe and Koenig, P.C.

(57) ABSTRACT

A method and a device for the longitudinal welding of profiles (2,5, 13) is provided in which a profile (13) that is to be provided with a weld seam (22, 23) is guided through a welding device (1), and in the welding device (1) a welding head (14, 15) produces a weld point (20, 21) on the profile (13), in order to manufacture a weld seam (22, 23). The profile movement is braked at selectable intervals from an essentially constant production speed down to the point at which the profile (13) is at a standstill, and is subsequently accelerated back to the production speed, while the application of welding energy to the profile (13) is switched off below a threshold transport speed. In order to avoid a gap in the resulting weld seam (22, 23), according to the present invention a welding head control system is used, with the aid of which the location of the weld point (20, 21) is moved in the direction of transport (12) of the profile (13), beginning from an initial point, each time the profile (13) is at a standstill, the weld point (20, 21) being moved back to the initial position, against the direction of transport (12) upon restarting of the transport movement after the threshold transport speed has been reached.

12 Claims, 3 Drawing Sheets

STATIONARY WELDING DEVICE AND METHOD FOR LONGITUDINAL WELDING OF PROFILES

BACKGROUND

The present invention relates to a stationary welding device for the longitudinal welding of profiles, having transport elements for the transport of a profile through the welding device, the transport elements being fashioned such that the movement of the profile can be braked at selectable intervals from a constant production speed down to the stoppage of the profile, and can subsequently be accelerated back to the production speed, and having at least one welding head that produces a weld point in order to manufacture a welded seam on the profile running through the welding device (1), with the application of welding energy to the profile being switched off below a threshold transport speed of the profile. The invention also relates to a corresponding method in which a profile that is to be provided with a weld seam is guided through a welding device, a weld point is produced on the profile in the welding device in order to manufacture a welded seam, the profile movement being braked at selectable intervals from a production speed down to a stoppage of the profile, and being subsequently accelerated back to the production speed, and the application of welding energy to the profile being switched off below the threshold transport speed.

Thus, the invention relates to a stationary welding device having transport elements for transporting a profile through the welding device, and having at least one welding head that produces a weld point in order to manufacture a weld seam on the profile moving through the welding device. The profile movement is braked at selectable intervals from an essentially constant production speed down to a stoppage of the profile, and is subsequently again accelerated to production speed, while the application of welding energy to the profile is switched off below a threshold transport speed of the profile. The method for longitudinal welding of profiles, on which the present invention is also based, corresponds in its features to the function of the described device.

Such devices and methods are typically used in the context of profiling installations in which metal strips are shaped in steps to form profiles or tubes while passing through a multiplicity of roll form tools. The welding station, which is typically subsequent to the tools in the production line, then for example makes it possible to weld together overlapping or abutting regions of the profile or of the tube, or also to weld two or more different profiles with one another.

For a finished product, or a product ready for further processing, the profiles or tubes must be cut into lengths at the end of the production line. Here, in continuously operating production lines traveling cutting machines are used that must be accelerated to the transport speed of the finished profile for the cutting into lengths, so that after the cutting they must naturally be braked and brought back to their initial position.

For such traveling cutting machines, a large construction and maintenance expense is required in order to enable the cuts to be made with the required precision and speed. For this reason, profiling installations having welding devices of the type named above have been developed in which the transport of the welded profile is stopped at selectable intervals, and is subsequently started again. This makes it possible to use a conventional, stationary cutting device for the cutting into pieces of the finished profiles; an expensive traveling cutting machine is thus not required.

However, this results in difficulties in the welding device. The braking of the production speed to the point at which the profile is at a standstill, as well as the subsequent acceleration of the profile to the production speed, each require a certain amount of time and thus a determinate transport distance. The quantity of welding energy that is brought into the profile material at the welding point naturally increases as the welding energy remains constant and the transport speed becomes slower. It is true that this can be compensated for the most part by a reduction of the welding energy, but this can be carried out only up to a threshold transport speed, which depends on the welding technology, below which the welding energy must be completely switched off in order to avoid local destruction of the material.

As a result, in a stationary welding device of the type named above, there remains a gap in the weld seam in the area of the location situated at the welding point during the stoppage of the profile. This gap becomes greater as the production speed is selected higher, and it also depends on how far downward the welding energy can be reduced. To the extent that such a gap in the weld seam is a disturbance in the finished product, it must be removed afterwards; a cutting out of the corresponding point by the stationary cutting machine present in the installation is out of the question, because two cuts are then required for each stop in the production, but each such cut requires two production stops. Thus, up to now the only possibility has been either to use a traveling cutting machine, or else to cut off the scrap separately.

SUMMARY

On the basis of this prior art, the underlying object of the present invention is to improve a welding device and method of the type named above in such a way that an uninterrupted weld seam can be produced despite the intermittent stoppage of the profile to be welded.

This object is achieved by a welding device having the welding head fashioned in such a way that the location of the weld point can be moved along the direction of transport of the profile, and that a control system is present for the welding head. The control system allows the location of the weld point to be moved in the direction of transport, beginning from an initial point. Each time the profile is at a standstill, the weld point is moved back to the initial position against the direction of transport after the restarting of the transport movement and the exceeding of the threshold transport speed. Additionally, according to a method of the invention, each time the profile is at a standstill, the location of the weld point is moved, beginning from an initial point, in the direction of transport of the profile, with the weld point being moved back to the initial position, against the direction of transport, after the restarting of the transport movement and exceeding the threshold transport speed.

The welding device according to the present invention, having transport elements for transporting a profile through the welding device, and having a welding head that produces a weld point for the manufacture of a weld seam on the profile is, as stated above, provided for the intermittent stopping of the profile movement, including a corresponding switching off of the welding energy, below a threshold transport speed. According to the present invention, it is further developed, and is in particular provided with a correspondingly constructed welding head, in such a way that upon each stoppage of the profile the location of the weld point is moved in the direction of transport, beginning from an initial point, and after the restarting of the transport movement and the exceeding of the threshold transport speed, the weld point is moved against the direction of transport back to the initial position. The moving back of the cutting point need not necessarily take place immediately after the exceeding of the threshold transport speed and the switching back on of the welding energy; rather, the weld point can optionally also be moved back to its initial point shortly before, or even during, the renewed braking of the profile movement.

The improvements according to the present invention of a known welding device, or of a known welding method, have the result that, despite the intermittent stopping of the transport movement of the profile, an uninterrupted weld seam, or at least a significant shortening of the length of the interruption, can be achieved. This is because, when the welding energy is switched on again during the acceleration of the profile, according to the present invention the weld point is moved in the direction of transport, i.e., towards the interrupted weld seam, so that the stretch that finally remains free of the weld seam is reduced in size.

Preferably, the location of the weld point is moved in the direction of transport by a distance such that when the threshold transport speed is exceeded during the restarting of the transport movement, the weld point continues the weld seam that was interrupted by the switching off of the application of the weld energy. Here, it can also be provided that a short stretch of the weld seam is welded in overlapping fashion, i.e., in doubled fashion.

Given suitably selected parameters, the backwards movement of the weld point during the transport of the profile has no negative influence on the manufacture of the weld seam, so that with the present invention a uniformly continuous weld seam can be manufactured even if the profile is intermittently stopped in order to be enable it to be cut into pieces by a stationary cutting machine.

In order to enable movement of the weld point or of the location of the weld point along the direction of transport, the welding head can be moved along the direction of transport. However, it is particularly simple if the welding head is fashioned such that the welding head need only be pivoted in order to move the weld point along the direction of transport of the profile. Of course, a combination of the two alternatives is also possible.

The present invention can be realized in particularly advantageous fashion by a laser welding device. In this case, the weld point can be moved along the direction of transport by a simple pivoting of the laser beam, without requiring provision of any translational movement of the welding head. With the use of a laser welding device, the pivoting of the laser beam can in addition be brought about in a particularly effective manner by providing the welding head with a pivotable mirror. In addition to this, it is of course also possible to provide a pivoting of the welding head as a whole.

Preferably, the welding device according to the present invention is designed in such a way that the momentary quantity of welding energy brought into the profile can be controlled in a manner dependent on the momentary speed of transport of the profile. In this case, when the profile is braked the quantity of welding energy can thus be reduced to the threshold transport speed, and can be correspondingly increased again upon acceleration of the transport movement, in order to enable a uniform weld seam to be achieved overall. In addition, the quantity of weld energy can be increased slightly while the weld point is moved back, against the direction of transport, to its initial position. This is usefully taken into account directly during the increasing of the quantity of welding energy during the acceleration of the transport movement.

However, with the movement according to the present invention of the location of the weld point it is even possible to do entirely without a regulation of the quantity of welding energy, if the welding head control system causes the movement back of the weld point during the restarting of the transport movement, and adapts this return movement to the acceleration of the profile in such a way that the relative speed of the weld point and the profile continuously corresponds closely to the production speed. In order here to be able to do without a regulation of the quantity of welding energy during the braking process of the profile as well, the welding energy can for example be switched off already at the beginning of the retardation, and the location of the weld point can be moved to the interruption of the weld seam while the profile is at a standstill, so that an uninterrupted, uniform weld seam results with no decreasing at all of the quantity of welding energy.

BRIEF DESCRIPTION OF THE DRAWINGS

An exemplary embodiment of the present invention is explained in more detail in the following on the basis of the drawings.

DETAILED DESCRIPTION OF THE PREFERRED EMBODIMENTS

Figure 1:
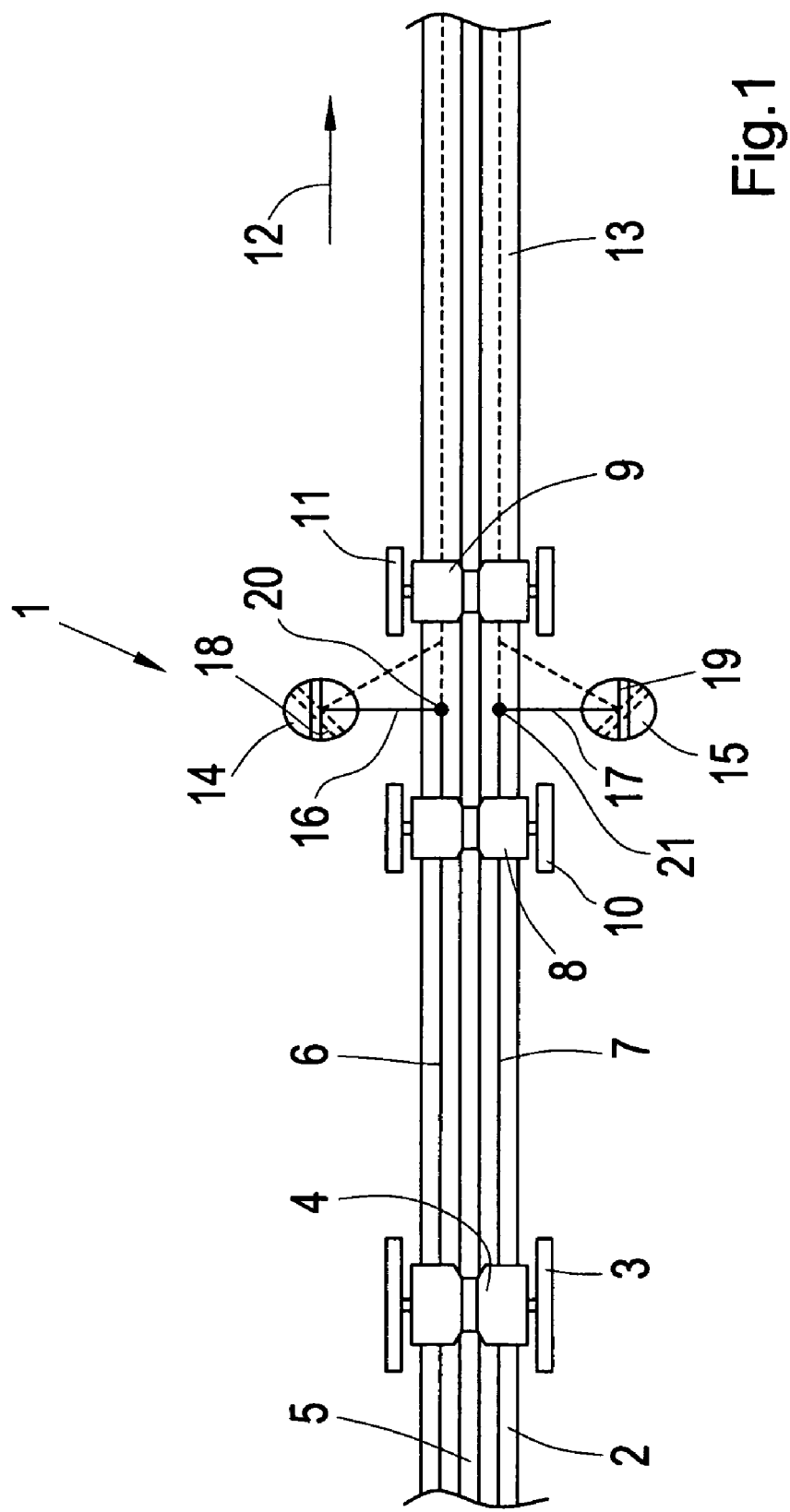
FIG. 1 shows a schematic top view of a welding device according to the present invention.

FIG. 1 shows a schematic top view of a welding device 1 according to the present invention. A first profile 2, of which only the upper wall is visible, is brought together with a second profile 5 by means of a driven guide roll pair 4 (of which only the upper guide roll is visible) mounted in a frame 3, in such a way that the second profile rests on the upper wall of the first profile 2. At the outer edges of second profile 5, here designated with reference characters 6 and 7, the second profile 5 is to be welded onto the first profile 2. This takes place between a first roll pair 8 and a second roll pair 9, which are both mounted in frames 10 and 11 and which press the two profiles 2 and 5 against one another. In relation to the direction of transport 12 of the finished profile 13, horizontally to the right and to the left of the profiles 2, 5 there are situated a left laser welding head 14 and a right laser welding head 15, each of which directs a respective laser beam 16, 17, coming from above from a direction perpendicular to the picture plane, onto a respective weld point 20, 21 on the edges 6 and 7 of the second profile 5, by means of a respective mirror 18, 19. The broken edge lines 6, 7 indicate that a finished profile 13 has been produced from the first profile 2 and the second profile 5 after leaving the welding device 1.

In order to realize the design of the present invention, here mirrors 18, 19 of the welding heads 14, 15, or the welding heads 14, 15 themselves, are fashioned so as to be capable of rotation in such a way that the laser beams 16, 17 can be pivoted along the direction of transport 12, and thus the weld points 20, 21 can be moved along the respective edges 6, 7, in the direction of transport 12 and counter to this direction.

If, now, the transport movement of the profile 13 is braked to a standstill by the welding device 1, first the energy of the laser beams 16, 17 is decreased until the laser beams 16, 17 are switched off below a threshold transport speed, in order to prevent damage of the profile material by an excessively high application of energy. The end of the weld seam thus moves away from weld points 20, 21 in the direction of transport 12 by a certain distance, until profile 13 reaches a complete standstill. When the profile 13 is restarted, upon reaching the threshold transport speed, the laser beams 16, 17 are again switched on, and their energy is successively increased until the production speed of the profile 13 has been reached. In order now to prevent an unwelded gap between the profiles 2 and 5, between the end of the weld seam and the beginning of the new weld seam, the mirrors 18, 19 of the welding heads 14, 15 are pivoted during the stoppage of the profile 13, while the laser beams 16, 17 are switched off, until, seen in the direction of transport 12, the location of weld points 20, 21 are situated clearly before the end of the weld seams produced up to this point, in order to enable the uninterrupted continuation of the weld seam upon restarting of the transport movement and the reaching of the threshold transport speed. In the drawing, this situation is indicated by broken lines for the laser beams 16, 17. During the acceleration of the profile 13, and, if necessary, also after the production speed has been reached, the mirrors 18, 19 of the welding heads 14, 15 are again pivoted back until the initial position of the laser beams 16, 17, represented by solid lines, or of the weld points 20, 21, is again reached. After this, the next stopping of the transport movement can take place.

Figure 2:
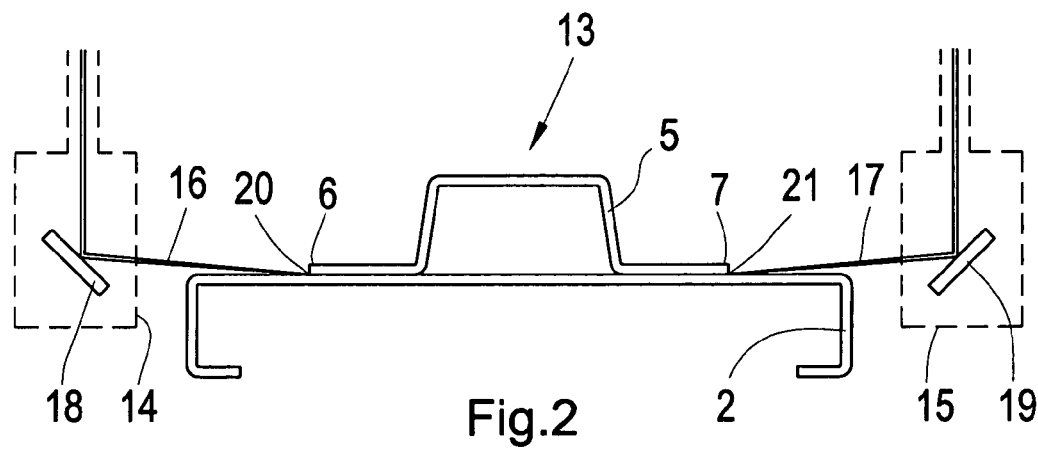
FIG. 2 shows the cross-section of a profile during welding.

FIG. 2 shows, in cross-section, the profile 13 manufactured in FIG. 1 during the welding process. The second profile 5 is placed on the first profile 2, and is welded with the first profile 2 at its edges 6, 7. Shown only schematically are the left and right laser welding heads 14, 15, with the pivotable mirrors 18, 19 situated therein, which deflect the laser beams 16, 17 onto the weld points 20, 21 situated on the edges 6, 7, at which a weld seam then results during the longitudinal movement of the profile 13. Through the use of the laser beams 16, 17, it is possible to move the weld points 20, 21 without any problems along the edges 6, 7 in and against the direction of transport 12 through simple pivoting movements of the mirrors 18, 19, without significantly changing the amount of welding energy transferred into the profile material.

Figure 3:
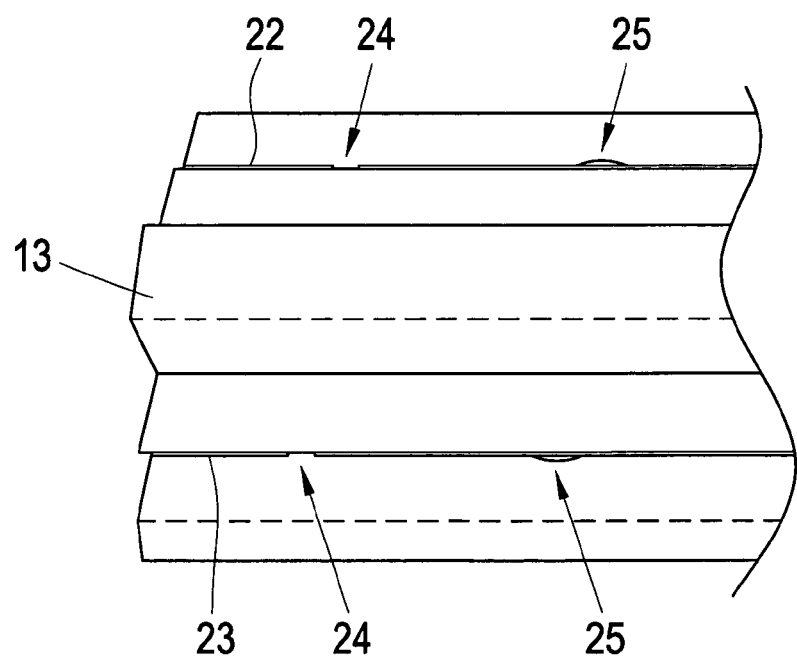
FIG. 3 shows a top view of a profile whose welding has been completed.

FIG. 3 shows a top view of the profile 13 already shown in FIG. 2. Here, two different types of controlling according to the present invention, for the creation of a left weld seam 22 and of a right weld seam 23, are symbolized. At the points marked with arrows 24, an interruption of the weld seam can be seen, resulting from the fact that the intention here is to avoid an overlapping of the weld seam, and the movement of the weld points 20, 21 in the direction of transport 12 during the stoppage of the profile 13 has been selected somewhat shorter than would be required for an uninterrupted weld seam 22, 23.

In contrast, such an overlapping can be seen at the points of weld seams 22, 23 marked with arrows 25 in FIG. 3. In order on the one hand to enable reliable avoidance of any interruption of the weld seams 22, 23, and on the other hand to compensate the quantity of welding energy, which may become unstable in the lowest range of the regulated laser output, the location of the weld points 20, 21 has been moved forward in the direction of transport 12 during the stoppage of the profile 13, far enough that an overlapping of the weld seams 22, 23 results when the laser beams 16, 17 are switched on again.

Figure 4:
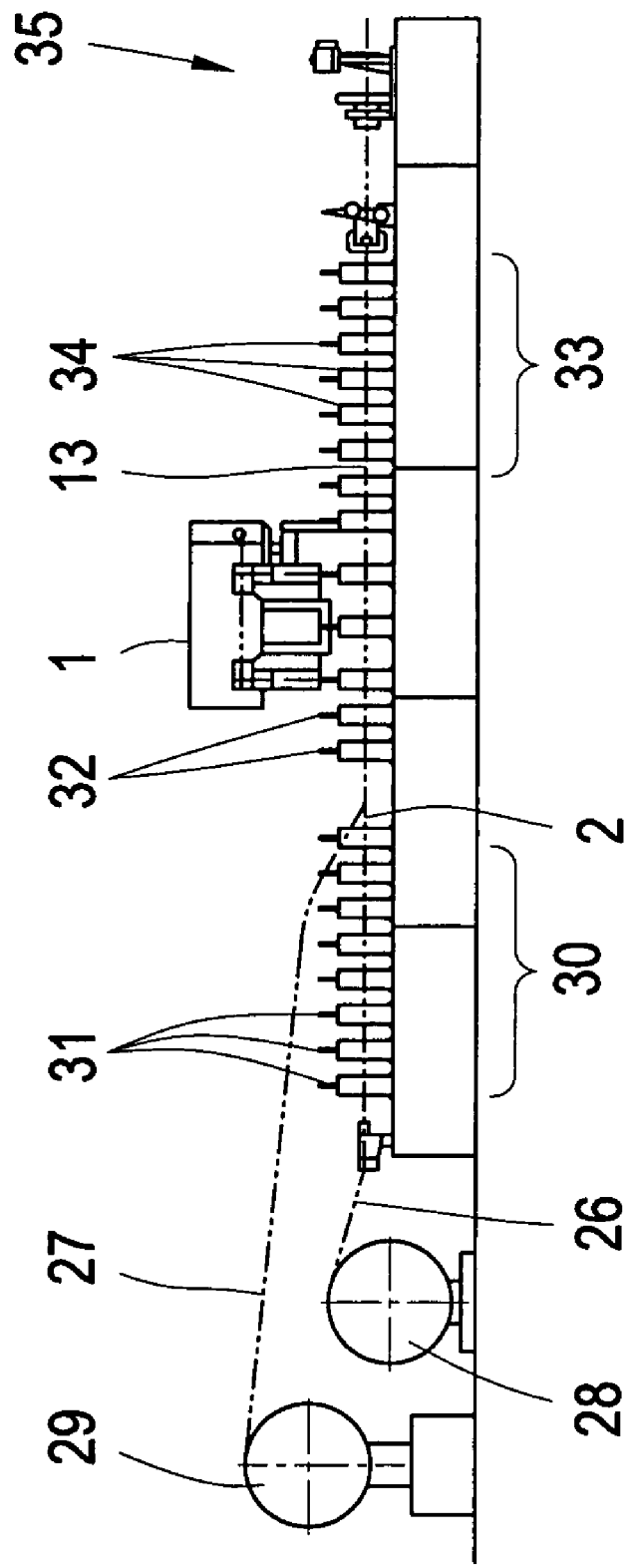
FIG. 4 shows a schematic side view of a profiling installation having an integrated welding device.

Finally, FIG. 4 schematically shows a profiling installation for intermittently stopped operation, in which the welding device 1 according to the present invention is integrated. A first metal strip 26 and a second metal strip 27 are unwound from a first supply spool 28 and a second supply spool 29. In order to form a support profile, the first metal strip 26 is led through a forming installation 30 having a plurality of roll forming tools 31. After forming installation 30, the formed first profile 2 is brought together with the second metal strip 27 and is further formed in additional roll forming tools 22, in which the second metal strip 27 is formed into a second profile 5. Subsequently, the profiles 2, 5 are supplied to welding device 1 according to the present invention, and, as is shown in FIG. 1, are welded with one another to form a profile 13. This profile 13 is further formed in a further forming installation 33, again having a plurality of roll forming tools 34, and is finally cut to the desired length in a stationary cutting machine 35.

The present invention therefore enables a high-quality mass production of profiles partly shaped in a complicated manner, even in profiling installations having stationary cutting machines.

LIST OF REFERENCE CHARACTERS 1 welding device
2 profile (first)
3 frame
4 guide roll pair
5 profile (second)
6 edge (left)
7 edge (right)
8 roll pair (first)
9 roll pair (second)
10 frame (first)
11 frame (second)
12 direction of transport
13 profile
14 welding head (left)
15 welding head (right)
16 laser beam (left)
17 laser beam (right)
18 mirror (left)
19 mirror (right)
20 weld point (left)
21 weld point (right)
22 weld seam (left)
23 weld seam (right)
24 weld seam interruption
25 weld seam overlapping
26 metal strip (first)
27 metal strip (second)
28 supply spool (first)
29 supply spool (second)
30 forming installation
31 roll forming tools
32 roll forming tools
33 forming installation
34 roll forming tools
35 cutting machine

The invention claimed is:

1. A stationary welding device for the longitudinal welding of profiles, comprising transport elements (31, 32, 34, 4, 8, 9) for transport of a profile (2, 5, 13) through a welding device (1), the transport elements (31, 32, 34, 4, 8, 9) being fashioned such that movement of the profile can be braked at selectable intervals from a constant production speed down to stoppage of the profile (13), and can subsequently be accelerated back to the production speed, and at least one welding head (14, 15) that produces a weld point (20, 21) in order to manufacture a weld seam (22, 23) on the profile (13) running through the welding device (1), application of welding energy to the profile (13) being switched off below a threshold transport movement speed of the profile (13), the welding head (14, 15) being arranged so that a location of the weld point (20, 21) can be moved along a direction of transport (12) of the profile (13), and a control system for the welding head (14, 15), controls the location of the weld point (20, 21) so that the weld point is moved in the direction of transport (12) while the welding energy is switched off, beginning from an initial position in a region where the weld seam has ended, each time the profile (13) is at a standstill, the weld point (20, 21) being moved back to the initial position where the weld seam ended, against the direction of transport (12), after the restarting of the transport movement and exceeding of the threshold transport speed at which the welding energy is switched on.

2. The stationary welding device as recited in claim 1, wherein the welding head (14, 15) is pivotable in order to move the weld point (20, 21).

3. The stationary welding device as recited in claim 1, wherein the welding head (14, 15) is movable along the direction of transport (12) of the profile (13) in order to move the weld point (20, 21).

4. The stationary welding device as recited in claim 1, wherein the control system for the welding head (14, 15) controls the welding head so that each time the profile (13) is at a standstill, the location of the weld point (20, 21) is moved in the direction of transport (12) a sufficient distance so that after restarting of the transport movement, and upon exceeding of the threshold transport speed, the weld point (20, 21) continues the weld seam (22, 23) that was interrupted by the switching off of the application of welding energy.

5. The stationary welding device as recited in claim 4, wherein the control system for the welding head (14, 15) controls movement back of the weld point (20, 21) to take place during the restarting of the transport movement, and is adapted to the acceleration of the profile (13) in such a way that a relative speed of the weld point (20, 21) and the profile (13) corresponds approximately to a production speed.

6. The stationary welding device as recited in claim 1, wherein the welding head (14, 15) comprises a laser welding head.

7. The stationary welding device as recited in claim 6, wherein the laser welding head is provided with a pivotable mirror (18, 19).

8. The stationary welding device as recited in claim 1, wherein a momentary quantity of welding energy brought into the profile (13) can be regulated in a manner dependent on a momentary transport speed of the profile (13).

9. A method for longitudinal welding of profiles, comprising guiding a profile that is to be provided with a weld seam through a welding device, a weld point being produced on the profile in the welding device in order to manufacture a weld seam, braking the profile movement at selectable intervals from a production speed down to a stoppage of the profile, and being subsequently accelerating back to the production speed, and the application of welding energy to the profile being switched off below a threshold transport speed, moving the location of the weld point each time the profile is at a standstill and the welding energy has been switched off, beginning from an initial position where the weld seam has ended, in a direction of transport of the profile, and moving the weld point back to the initial position, against the direction of transport, after restarting of the transport movement and exceeding the threshold transport speed at which the welding energy is switched on.

10. The method as recited in claim 9, wherein the location of the weld point during each stoppage of the profile is moved in the direction of transport far enough that after the restarting of the transport movement, upon the exceeding of the threshold transport speed, the weld point continues the weld seam that was interrupted by switching off of the application of the weld energy.

11. The method as recited in claim 9, wherein the movement back of the weld point takes place during the restarting of the transport movement, and is adapted to an acceleration of the profile in such a way that a relative speed of the weld point and the profile corresponds approximately to a production speed.

12. The method as recited in claim 9, wherein a laser beam is used for the welding.

* * * * *